April 8, 1958     W. C. BERGSTROM     2,829,544
COUNTERSINKING AND COUNTERBORING TOOL Filed Dec. 7, 1953     2 Sheets-Sheet 1

INVENTOR.
WALTER C. BERGSTROM
BY
Wooding and Kerue
Attys.

April 8, 1958 W. C. BERGSTROM 2,829,544
COUNTERSINKING AND COUNTERBORING TOOL
Filed Dec. 7, 1953 2 Sheets-Sheet 2

INVENTOR.
WALTER C. BERGSTROM
BY
Woodling and Krost
attys.

United States Patent Office 2,829,544
Patented Apr. 8, 1958

2,829,544

COUNTERSINKING AND COUNTERBORING TOOL

Walter C. Bergstrom, Cleveland, Ohio, assignor to The Weldon Tool Company

Application December 7, 1953, Serial No. 396,518

3 Claims. (Cl. 77—73.5)

This invention relates to new and useful improvements in countersinking and counterboring tools.

An important object of the invention is the provision of constructions for such tools which will prevent chattering of the tool in use, provide precision smooth surfaces of the work, provide for more rapid ejection of the chips or shavings, and deburr the work.

Another important object is the provision of a tool body with a spirally generated beveled surface and a chip or shaving receiving opening or bore intersecting and opening out into such surface to provide an improved shear action cutting edge having the necessary relief or cutting clearance.

Another important object is the arrangement of such cutting edge relative to said spirally generated beveled surface to cause the cutting edge to recede as a compound curved cutting edge which will function with a stabilizing shear cutting action.

A further important object is the provision of a tool of the above character in which the chip or shaving receiving opening penetrates not only the spirally generated beveled surface, but also the counterboring portion of the tool to additionally provide the latter with an arcuate cutting edge as a continuation of the curved cutting edge provided in said spirally generated beveled surface, whereby the tool can be employed to simultaneously countersink and counterbore an opening in the work.

Still another important object is the provision of a tool of the above character for countersinking and counterboring relatively large holes and which is provided with a pilot portion into which extends the chip or shaving receiving opening or bore to provide for making this opening or bore of substantially larger diameter or capacity for greater capacity of the chip or shaving ejection operation.

A still further object is the provision of a tool which will cut a crowned countersunk surface and will also effectively remove burrs from the edges of holes and the corners of cylindrical workpieces.

Other objects and a fuller understanding of this invention may be had by referring to the following description and claims, taken in conjunction with the accompanying drawings, in which:

Figure 1:
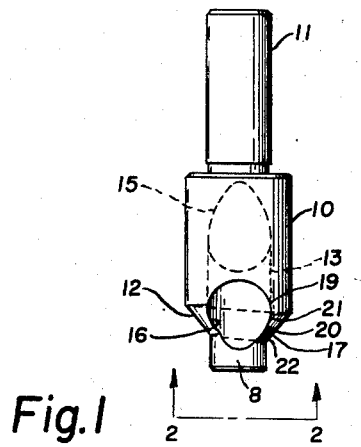
Figure 1 is a side view of the improved tool having a spirally generated beveled surface according to the concepts of this invention.

Referring now more particularly to the drawings, the numeral 10 designates a cylindrical tool body having a chuck driving engaging shank 11. The end of the tool body opposite the shank 11 is provided with a cylindrical reduced pilot 8. Between this pilot and the cylindrical body 10 is a spirally generated beveled surface 12 which is arranged at the desired angle for which the tool is designed to countersink and is here shown arranged substantially at a forty degree angle with a plane arranged normal to the axis of the tool. The body 10 may be of various shaped cross section and is termed the counterboring portion of the tool, while the beveled surface is termed the countershinking portion thereof. A large chip or shaving receiving bore 13, circular in cross section, extends through the tool at an angle of approximately forty-five degrees to the tool axis to intersect and open out at its lower end 14 into, not only the spirally generated beveled surface 12 and the adjoining cylindrical surface of the tool body 10, but also into the cylindrical adjoining surface of the pilot 8. The upper end 15 of this bore intersects and opens out into the upper cylindrical surface of the tool body adjacent the shank end thereof to rapidly guide and discharge chips and shavings from the cutting operation. The axis of the bore 13 is preferably arranged generally normal to a point on the beveled surface 12. Opposite side edges 16 and 17 of the lower end of the bore at their juncture with the spirally generated beveled surface and the cylindrical surfaces of the body and pilot, penetrate or intercept the entire width of the beveled surface 12. The edge 17 constituting the cutting edge of the tool is disposed at the start or beginning of the spirally generated beveled surface 12, while the opposite edge 16 is arranged in the trailing or tail end of this surface. Thus, the cutting edge 17 has greater radial extent than the opposite edge 16 to provide for cutting edge clearance. It will be observed that the counterboring portion of the tool is provided with an arcuate cutting edge 19 used in counterboring operations, and that this arcuate cutting edge 19 is a continuation of the cutting edge 17. Due to the relatively large size of the bore 13, as compared with the width of the spirally generated beveled surface 12, this bore provides the surface 12 with a relative large gap or opening which also serves as a relief or clearance just ahead of the cutting edges 17 and 19. Referring to Figure 1 the width of the spirally generated beveled surface 12 would be the length of the edge to which the lead lines from the reference numerals 12 and 16 extend.

It will be observed that the mid-portion 20 of the arcuate cutting edge 17 recedes at a point about midway the width of the spirally generated beveled surface to form a compound curved cutting edge having a first cutting section 21 nearest the cylindrical body 10 and a second cutting section 22 nearest the pilot 8. These two cutting sections 20 and 22 may be referred to as positive and negative portions of the cutting edge, which when in use, shave the metal of the work with a shearing action and gather the shavings toward the mid-point 20 to assist in the stabilization of the tool against chattering. The extension 19 of the cutting edge 17 constitutes a third cutting section thereof in a combined counterboring and countersinking operation. Since this third cutting section 19 is a continuation of the cutting edge 17, defined by the circular end 14 of the core and is disposed in the cylindrical body 10, it presents an undercut curved edge similar to the cutting edge 17; but at such an angle relative of the cylindrical surface of the body 10 that it cuts with a shearing action ahead of the cutting section 21 when counterboring. However, the sections 19 and 21 being at different sectors of the opening 14, act as a compound cutting edge with substantially opposing shear cutting action in somewhat the same manner as the sections 21 and 22 to further stabilize the tool against chattering when in use. It will also be observed that the cutting sections 21 and 22 are arranged generally diagonally across the width of the spirally generated beveled surface 12.

Figure 7:
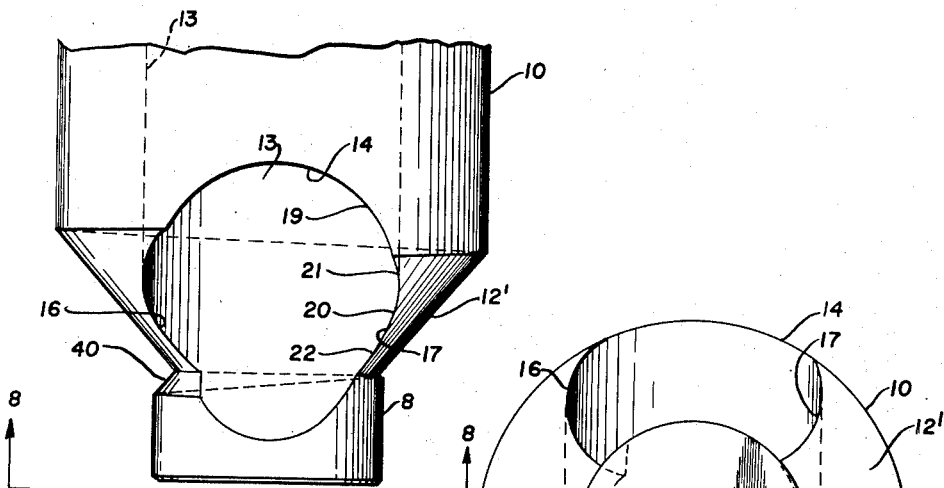
Figure 7 is an enlarged side elevation of the lower end of the tool provided with a beveled countersinking portion which is spirally generated on the order of a clockspring or involute spiral.
Figure 8:
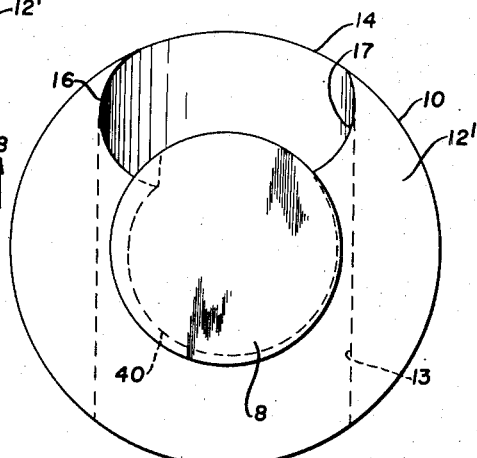
Figure 8 is an end elevation thereof.
Figure 9:
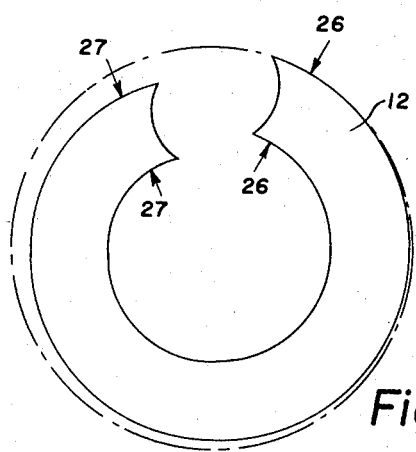
Figure 9 is a somewhat diagrammatic view of a radially generated spirally beveled surface, plotted in a flat plane.
Figure 10:
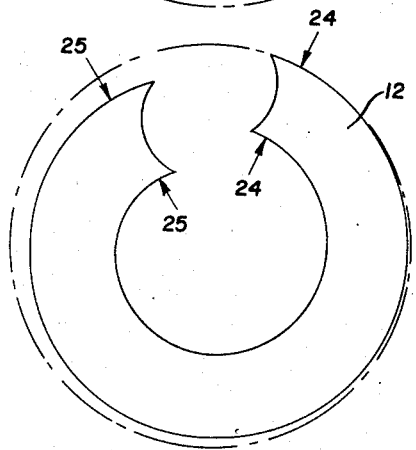
Figure 10 is a similar view of a longitudinally spirally generated beveled surface, plotted in a flat plane.

This spirally generated beveled surface 12 may be provided in several ways. Preferably, it is spirally generated longitudinally of the tool on the order of a screw spiral or helix, and as such is diagrammatically plotted in a plane in Figure 10, where the width of the beginning of the spiral, designated by the numeral 24, is narrower than the width of the spiral at its trailing end, designated by the numeral 25. This spirally generated beveled surface is continued around the tool from the cutting edge 17 for about three hundred degrees about its axis, where this beveled surface is intersected or interrupted by the chip receiving bore 13. In other words, the circular bore 13 interrupts or removes the portion of the beveled surface 12 as well as portions of the cylindrical walls of both the body 10 and pilot 8. The three hundred degree extent of the spirally generated surface is sufficient to form a relief or cutting clearance for the cutting edges 17 and 19 to dispose them at a greater radial distance from the axis of the tool than the opposite trailing edge 16 of the bore 13. Viewing Figure 1, it will be observed that this spirally generated beveled surface adjacent the edge 16 of the bore 13 is disposed further along the longitudinal direction of the tool and into the surface of the body 10 at a distance from the cutting edge 17 to form relief or clearance for the cutting edge 19 disposed on the cylindrical surface of the tool body 10 for counterboring. This spirally generated beveled surface may also be provided by a radially generated spiral surface on the order of a clock-spring spiral or a helix which will relieve this surface and provide requisite cutting edge clearance. However, as shown in Figure 7, such radially generated spiral surface 12' will cut into or groove the pilot 8 as indicated by the numeral 40. Figure 9 diagrammatically shows a radially generated clock-spring spiral in which the width of the spirally beveled surface 12 is the same at its initiating point 26 as it is at its other or trailing end 27. This spirally generated beveled surface 12 may also be provided by a combination of the longitudinally and radially generated spirals, or be suitably relieved or profiled with a relief surface ahead of the cutting edge. Therefore, the term "spirally generated beveled surface," wherever referred to herein, shall include any of these ways, or a combination of them, for relieving the beveled surface and provide clearance for the cutting edges.

Figure 4:
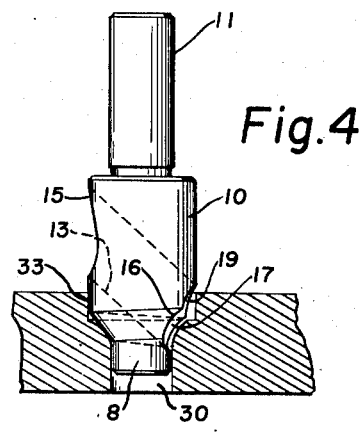
Figure 4 is a side elevation of the tool turned on its axis about ninety degrees from the position shown in Figure 1 and illustrating it engaged with work shown in section to illustrate the combined countersinking and counterboring action of the tool.
Figure 2:
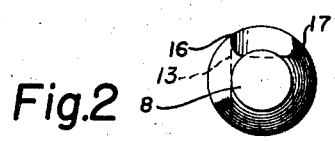
Figure 2 is an end elevation thereof looking from the direction of the line 2—2 of Figure 1.
Figure 5:
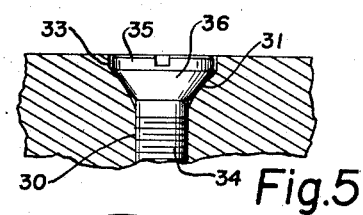
Figure 5 is a vertical section through work showing it provided with a countersunk and counterbored portion of a hole in which a screw head is shown inserted.
Figure 3:
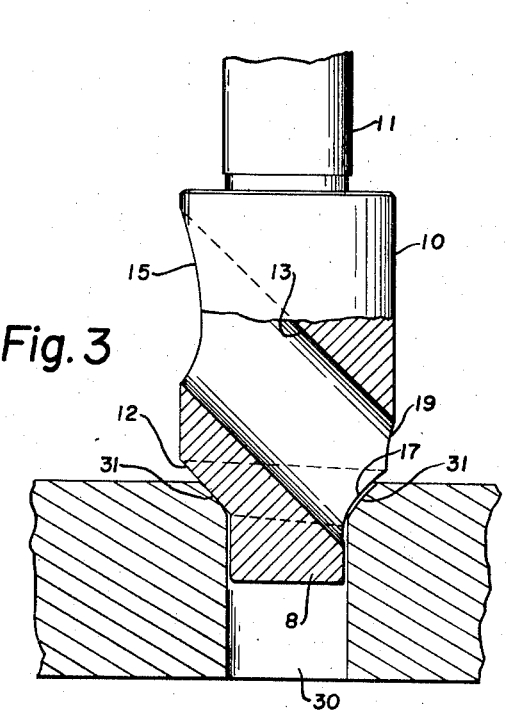
Figure 3 is an enlarged side view, partly in longitudinal section, showing the tool engaged in countersinking a drilled hole in a workpiece.
Figure 6:
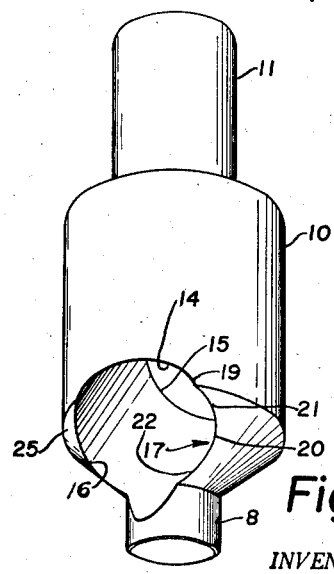
Figure 6 is a perspective view of the end of the tool shown in Figure 2 with the tool tilted topside away from the viewer.

Reference to Figure 4 will illustrate the use of the tool in combined countersinking, counterboring and deburring operations; and Figures 3 and 5 will indicate the slightly crowned countersunk portion 31 of a hole 30 in the work, provided by the cutting sections 20, 21 and 22 of the cutting edge. This crowning of the countersunk portion is extremely slight and is shown exaggerated in the drawing for clarity. These two operations of countersinking and counterboring are simultaneously performed by the tool with the cutting sections 20, 21 and 22 of the cutting edge 17 forming the countersink 31, while the cutting section 19 is counterboring the hole 30 to provide the counterbored portion 33, shown in Figure 5. A screw 34 having a head 35 with a beveled underside 36 is shown arranged in the hole with the beveled portion 36 making a line contact with the crowned countersink 31 and with the cylindrical head of the screw disposed within the counterbore 33 substantially flush with the surface of the work. Thus, beveled screw heads of various sizes and angles of bevel, or those having irregularities, will find their proper seat upon the crowned countersunk surface 31. Needless to say, all cutting edges of the improved tool will also serve as an efficient deburring tool to trim all burrs from the edges or corners of holes or the like.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tool of the class described comprising, a cylindrical body having a spirally generated beveled surface, and a cylindrical pilot, said surface and pilot having a chip receiving bore penetrating the same, said bore having a diameter greater than the width of said spirally generated beveled surface thereby causing a common end of said bore to penetrate and open into the cylindrical surfaces of said body and pilot, the juncture of the edges of said bore with the cylindrical surface of said body and said spirally generated beveled surface forming two spaced juncture edges, one of which has greater radial extent than the other to provide a compound arcuate cutting edge with clearance, and said compound arcuate cutting edge having a first curved cutting section arranged in said cylindrical surface of said body and a second curved cutting section arranged in said spirally generated beveled surface, said first and second curved cutting sections functioning with shear cutting action when rotated in a workpiece to assist stabilization of the tool against chattering and to rapidly eject chips from said cutting sections.

2. A combined countersinking and counterboring tool comprising, a body having a counterboring portion and a countersinking portion, said countersinking portion having a spirally generated beveled surface and a pilot portion, said beveled surface and pilot portion having a chip receiving opening penetrating the same, said opening having a diameter greater than the width of said spirally generated beveled surface to cause a common end of said opening to penetrate and open into and entirely across said surface and extend into said counterboring and pilot portions, the juncture edges of said opening with the said spirally generated beveled surface and the surface of said counterbore portion forming two spaced juncture edges, one of said juncture edges having greater radial extent than the other to provide a compound arcuate cutting edge having a first curved cutting section arranged in said counterboring portion and a second curved cutting section arranged in said spirally generated beveled surface, said first and second curved cutting sections functioning with shear cutting action when rotated in a workpiece to simultaneously counterbore and countersink a drilled opening and to discharge chips into said portions of said opening which penetrate all three of said countersinking, counterboring and pilot portions to cause a rapid ejection of chips.

3. A combined countersinking and counterboring tool comprising a body having countersinking and counterboring portions and a pilot member, said countersinking portion including a spirally generated beveled surface, said counterboring portion including an annular surface, a bore extending through said tool and intersecting said spirally generated beveled surface, said annular surface and said pilot member, the intersection of said bore with said spirally generated beveled surface forming a countersinking cutting edge and a relieved trailing edge, the intersection of said bore with said annular surface forming a counterboring cutting edge.

References Cited in the file of this patent

UNITED STATES PATENTS

| | | |
|---|---|---|
| 370,484 | Latham | Sept. 27, 1887 |
| 724,520 | Taylor | Apr. 7, 1903 |

FOREIGN PATENTS

| | | |
|---|---|---|
| 966,178 | France | Mar. 1, 1950 |